United States Patent
Liao et al.

(10) Patent No.: US 12,275,595 B2
(45) Date of Patent: Apr. 15, 2025

(54) LOGISTICS CONVEYING LINE, LOGISTICS CONVEYING LINE SYSTEM, AND LOGISTICS CONVEYING METHOD

(71) Applicant: CONTEMPORARY AMPEREX TECHNOLOGY (HONG KONG) LIMITED, Hong Kong (CN)

(72) Inventors: Shunlin Liao, Ningde (CN); Xiuzhi Zhai, Ningde (CN); Dingshan Yu, Ningde (CN); Kun Qiu, Ningde (CN); Xueqing Gong, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 89 days.

(21) Appl. No.: 18/354,639

(22) Filed: Jul. 19, 2023

(65) Prior Publication Data
US 2023/0356956 A1    Nov. 9, 2023

Related U.S. Application Data

(63) Continuation of application No. PCT/CN2022/102286, filed on Jun. 29, 2022.

(30) Foreign Application Priority Data
Sep. 30, 2021 (CN) .......................... 202111158300.9

(51) Int. Cl.
*B65G 35/06*    (2006.01)
*B65G 17/00*    (2006.01)
*B65G 35/08*    (2006.01)

(52) U.S. Cl.
CPC ........... *B65G 35/06* (2013.01); *B65G 17/005* (2013.01); *B65G 35/08* (2013.01)

(58) Field of Classification Search
CPC ....... B65G 35/06; B65G 35/08; B65G 17/005
(Continued)

(56) References Cited

U.S. PATENT DOCUMENTS

| 4,669,607 | A | * | 6/1987 | Mason | ................. B65G 25/02 |
| | | | | | 198/774.3 |
| 5,242,043 | A | * | 9/1993 | Sturm | ................. B23Q 7/1484 |
| | | | | | 198/803.2 |

(Continued)

FOREIGN PATENT DOCUMENTS

| CN | 204110798 U | 1/2015 |
| CN | 107934524 A | 4/2018 |

(Continued)

OTHER PUBLICATIONS

The World Intellectual Property Organization (WIPO) International Search Report and Written Opinion for PCT/CN2022/102286 Aug. 31, 2022 13 pages (including English translation).

(Continued)

*Primary Examiner* — James R Bidwell
(74) *Attorney, Agent, or Firm* — ANOVA LAW GROUP, PLLC

(57) ABSTRACT

A logistics conveying line for conveying a workpiece includes a frame including at least two stations and a driving mechanism including a driving portion and a connecting member. The driving portion is movably mounted at the frame. The connecting member is movably mounted at the driving portion. The connecting member is configured to switch between a connected state and a disconnected state with respect to a carrier. The carrier is configured to bear the workpiece. The driving portion is configured to, when the connecting member is in the connected state with respect to the carrier, drive the carrier to move from one of the stations to another one of the stations.

14 Claims, 8 Drawing Sheets

(58) Field of Classification Search
USPC .................................. 198/465.1, 468.01
See application file for complete search history.

(56) References Cited

U.S. PATENT DOCUMENTS

| | | | | |
|---|---|---|---|---|
| 5,388,684 A | * | 2/1995 | Peck ...................... | B65G 35/06 |
| | | | | 198/465.1 |
| 5,465,827 A | * | 11/1995 | Nakagawa ............. | B65G 35/06 |
| | | | | 104/168 |
| 5,636,962 A | | 6/1997 | Okada et al. | |
| 2005/0224315 A1 | * | 10/2005 | Rice ................. | H01J 37/32743 |
| | | | | 198/463.1 |

FOREIGN PATENT DOCUMENTS

| | | | | |
|---|---|---|---|---|
| CN | 111846870 A | | 10/2020 | |
| CN | 213111412 U | | 5/2021 | |
| CN | 113911665 A | | 1/2022 | |
| DE | 20202491 U1 | | 5/2002 | |
| DE | 202015105184 U1 | | 4/2016 | |
| JP | 6062717 B2 | | 1/2017 | |
| WO | WO-2012028939 A1 | * | 3/2012 | ............. B65G 23/42 |

OTHER PUBLICATIONS

The European Patent Office (EPO) The Extended European Search Report for Application No. 22874339.9 Jun. 3, 2024 8 Pages.

* cited by examiner

LOGISTICS CONVEYING LINE, LOGISTICS CONVEYING LINE SYSTEM, AND LOGISTICS CONVEYING METHOD

CROSS-REFERENCE TO RELATED APPLICATIONS

This application is a continuation of International Application No. PCT/CN2022/102286, filed on Jun. 29, 2022, which is based on and claims priority to Chinese patent application no. 202111158300.9 filed on Sep. 30, 2021, the disclosures of which are incorporated herein by reference in their entirety.

TECHNICAL FIELD

The present application relates to the field of battery processing, and in particular, to a logistics conveying line, a logistics conveying system, and a logistics conveying method.

BACKGROUND ART

With the vigorous development of new energy technology, application fields of the new energy technology are becoming increasingly extensive. Battery technology is an important factor related to the development of the new energy technology. A battery comprises battery cells. Processing of the battery cells involves a plurality of different processes, and the processes are completed at different stations. In order to complete the processing of the battery cells, the battery cells often need to be moved from one station to a further station.

During the processing of the battery cells, a time for movement between stations may directly affect production efficiency of the battery cell. If a long time is required for movement of the battery cells between stations, the production efficiency of the battery cell is low.

SUMMARY

In accordance with the disclosure, there is provided a logistics conveying line for conveying a workpiece including a frame including at least two stations and a driving mechanism including a driving portion and a connecting member. The driving portion is movably mounted at the frame. The connecting member is movably mounted at the driving portion. The connecting member is configured to switch between a connected state and a disconnected state with respect to a carrier. The carrier is configured to bear the workpiece. The driving portion is configured to, when the connecting member is in the connected state with respect to the carrier, drive the carrier to move from one of the stations to another one of the stations.

BRIEF DESCRIPTION OF THE DRAWINGS

Various other advantages and benefits will become apparent to those of ordinary skill in the art upon reading the following detailed description of some implementations. The accompanying drawings are merely for the purpose of illustrating the implementations and are not to be construed as limiting the present application. Moreover, like components are denoted by like reference numerals throughout the accompanying drawings. In the accompanying drawings.

REFERENCE NUMERALS IN THE SPECIFIC IMPLEMENTATIONS

Figure 1:
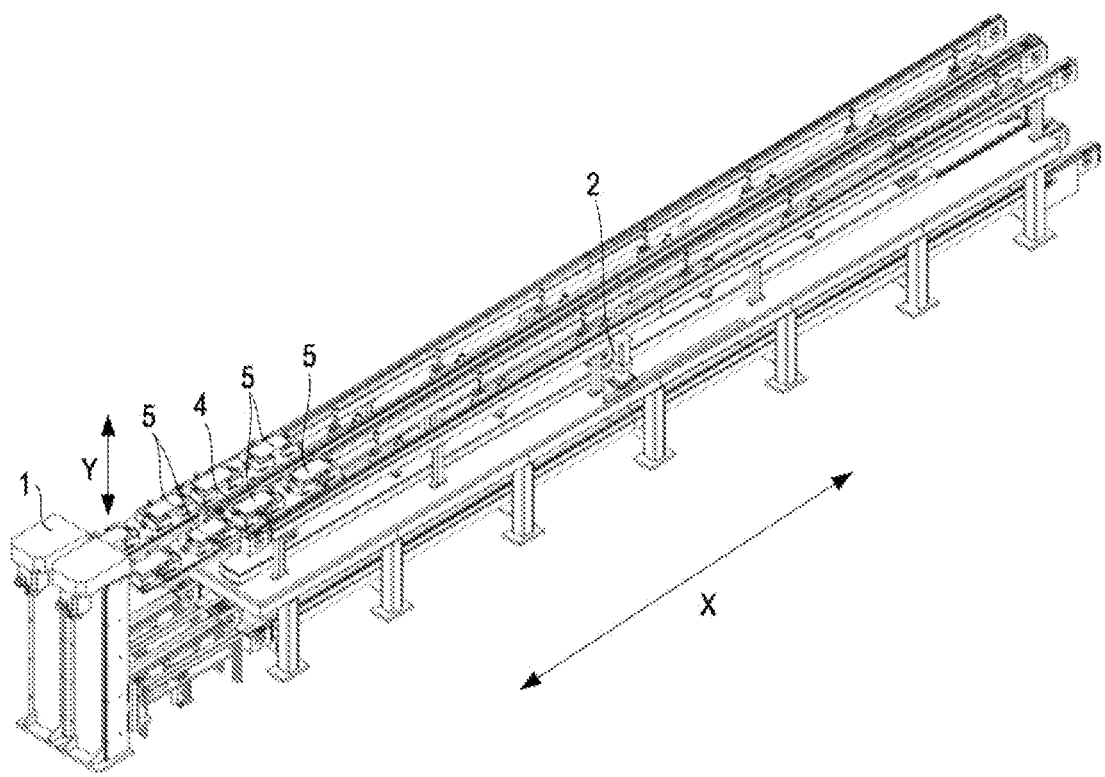
FIG. 1 is a three-dimensional schematic structural diagram of a logistics conveying line provided according to an embodiment of the present application, in which some battery cells are placed.

Frame 1, driving mechanism 2, positioning member 3, carrier 4, and battery cell 5;
rack 11, connecting frame 12, and leg 13;
first driving portion 21, connecting member 22, second driving portion 23, and second supporting member 24;
driving motor 211, first supporting member 212, gear 213, and guide member 214;
slide rail 214a, and slider 214b;
driving pin 221, and second supporting member 222;
recessed portion 41, and through hole 42.

DETAILED DESCRIPTION OF EMBODIMENTS

Embodiments of the technical solutions of the present application will be described in more detail below with reference to the drawings. The following embodiments are merely intended to more clearly illustrate the technical solutions of the present application, so they merely serve as examples, but are not intended to limit the scope of protection of the present application.

Unless otherwise defined, all technical and scientific terms used herein have the same meanings as those commonly understood by those skilled in the art to which the present application belongs. The terms used herein are merely for the purpose of describing specific embodiments, but are not intended to limit the present application. The terms "comprising" and "having" and any variations thereof in the description and the claims of the present application as well as the brief description of the drawings described above are intended to cover non-exclusive inclusion.

In the description of the embodiments of the present application, the technical terms "first", "second", etc. are merely used for distinguishing different objects, and are not to be construed as indicating or implying relative importance or implicitly indicating the number, particular order or primary-secondary relationship of the technical features modified thereby. In the description of the embodiments of the present application, the phrase "a plurality of" means two or more, unless otherwise explicitly and specifically defined.

The phrase "embodiment" mentioned herein means that the specific features, structures, or characteristics described in conjunction with the embodiment can be encompassed in at least one embodiment of the present application. The phrase at various locations in the description does not necessarily refer to the same embodiment, or an independent or alternative embodiment exclusive of another embodiment. Those skilled in the art understand explicitly or implicitly that the embodiment described herein may be combined with another embodiment.

In the description of the embodiments of the present application, the term "and/or" is merely intended to describe the associated relationship of associated objects, indicating that three relationships may exist, for example, A and/or B may indicate: the following three cases: only A exists, both A and B exist, and only B exists. In addition, the character "/" herein generally indicates an "or" relationship between the associated objects. In this disclosure, the phrases "at least one of A, B, and C" and "at least one of A, B, or C" both mean only A, only B, only C, or any combination of A, B, and C.

In the description of the embodiments of the present application, the term "a plurality of" means two or more (including two), similarly the term "a plurality of groups" means two or more groups (including two groups), and the term "a plurality of pieces" means two or more pieces (including two pieces).

In the description of the embodiments of the present application, the orientation or position relationship indicated by the technical terms "central", "longitudinal", "transverse", "length", "width", "thickness", "upper", "lower", "front", "rear", "left", "right", "vertical", "horizontal", "top", "bottom", "inner", "outer", "clockwise", "counter-clockwise", "axial", "radial", "circumferential", etc. are based on the orientation or position relationship shown in the drawings and are merely intended to facilitate and simplify the description of the embodiments of the present application, rather than indicating or implying that the device or element considered must have a particular orientation or be constructed and operated in a particular orientation, and therefore not to be construed as limiting the embodiments of the present application.

In the description of the embodiments of the present application, unless otherwise explicitly specified and defined, the technical terms "mounting", "connected", "connection", "fixing", etc. should be understood in a broad sense, for example, they may be a fixed connection, a detachable connection, or an integrated connection; may be a mechanical connection or an electrical connection; and may be a direct connection or an indirect connection by means of an intermediate medium, or internal communication between two elements or interaction relationship between two elements. For those of ordinary skill in the art, the specific meanings of the above terms in the embodiments of the present application can be understood according to specific situations.

In a related technology, a logistics conveying line is adopted to move battery cells between stations to complete different battery cell processes. The logistics conveying line comprises a speed chain (or belt), and the speed chain (or belt) is driven to move. A battery cell is placed in a tray. The tray is directly placed on the speed chain (or belt), and a friction force between the speed chain (or belt) and the tray is used to move the tray with the speed chain (or belt), so that the tray moves from one station to a further station, and the battery cell moves with the tray from one station to a further station to complete different processes.

The applicant has found that there are at least the following problems in the related technology: the conveying line uses the friction force to convey the tray loaded with the battery cell, and the friction force between the conveying line and the tray is small, so that the tray transport speed cannot be too fast. If the speed is too fast, the tray may slip, so that the tray cannot be transported. This limits production efficiency of the battery cell.

The applicant has found through research that the battery cell conveying manner in the related technology is to use the friction force between the tray and the speed chain (or belt) for conveying, and the maximum speed of the conveying line can only reach 18 m/min. It is difficult to increase the battery cell conveying speed without changing a stress manner during battery cell conveying. If the stress manner of the battery cell is increased, normal processes of the battery cell may be affected. Therefore, through creative labor and research, the applicant has provided a technical solution in which during conveying of a battery cell, the battery cell is kept connected to a carrier bearing the battery cell, but the battery cell can be far away from the carrier of the battery cell during normal processing of the battery cell. In this technical solution, because the stress manner of the battery cell during transfer transportation is changed, and a contact manner is adopted to drive the battery cell to be transferred and transported with the carrier, the battery cell can be reliably transported without slipping no matter how fast the transfer transportation speed is. In addition, normal processing of the battery cell is not affected.

A logistics conveying line disclosed in an embodiment of the present application is used for processing and production of a battery cell and a component with similar production links. The battery cell can be used in, but not limited to, a power consuming device such as a vehicle, a ship or an aircraft. The power consuming device may be, but is not limited to, a mobile phone, a tablet, a notebook computer, an electric toy, a power tool, a battery cart, an electric vehicle, a ship, a spacecraft, etc. The electric toy may include a stationary or mobile electric toy, such as a game console, an electric vehicle toy, an electric ship toy, and an electric airplane toy. The spacecraft may include an airplane, a rocket, a space shuttle, a spaceship, etc.

The technical solution provided in the present application will be explained in more detail below with reference to FIGS. 1 to 18.

Figure 2:
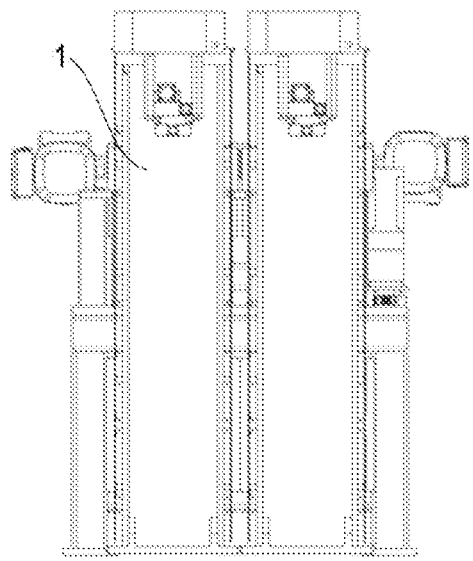
FIG. 2 is a schematic side view of a logistics conveying line provided according to an embodiment of the present application.
Figure 3:
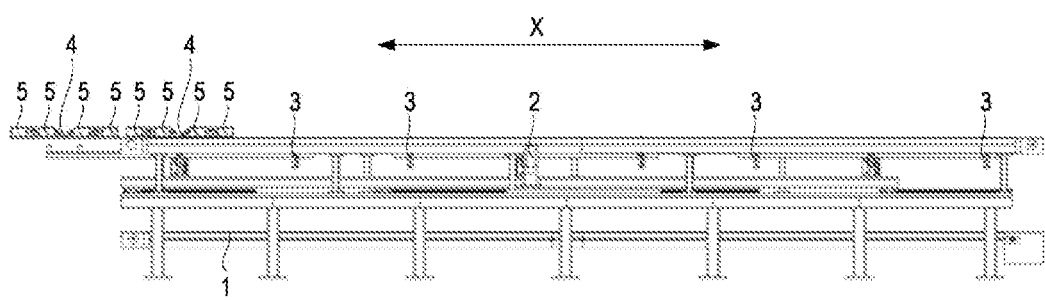
FIG. 3 is a schematic front view of some components of a logistics conveying line provided according to an embodiment of the present application.
Figure 4:
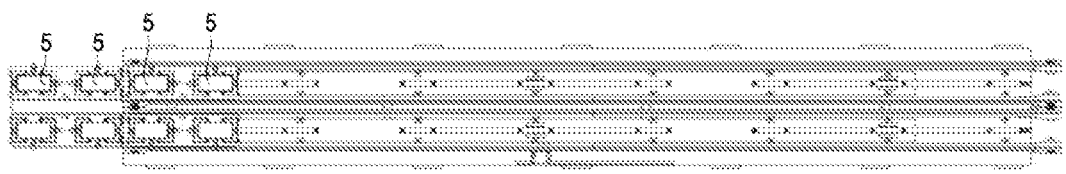
FIG. 4 is a schematic top view of some components of a logistics conveying line provided according to an embodiment of the present application.
Figure 5:
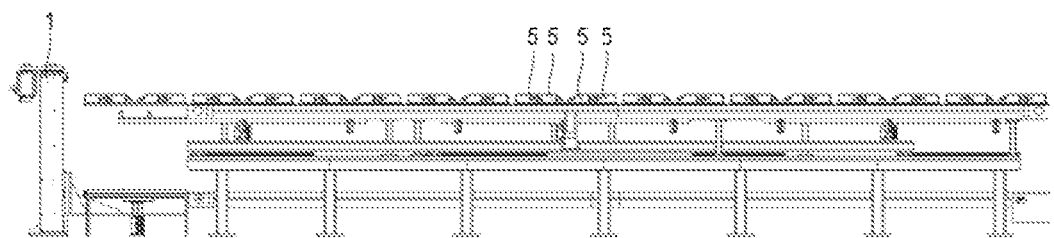
FIG. 5 is a schematic front view of a logistics conveying line provided according to an embodiment of the present application, which is filled with battery cells.
Figure 6:
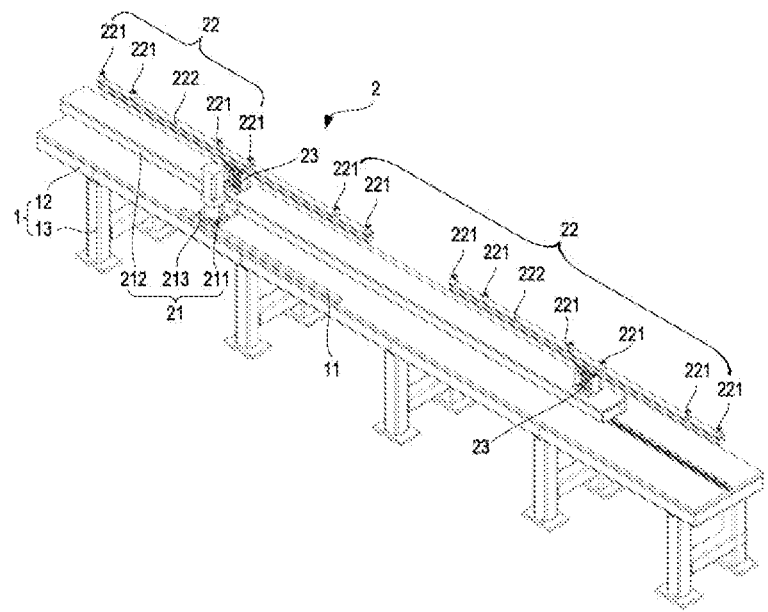
FIG. 6 is a three-dimensional schematic diagram of a driving mechanism of a logistics conveying line provided according to an embodiment of the present application.
Figure 7:
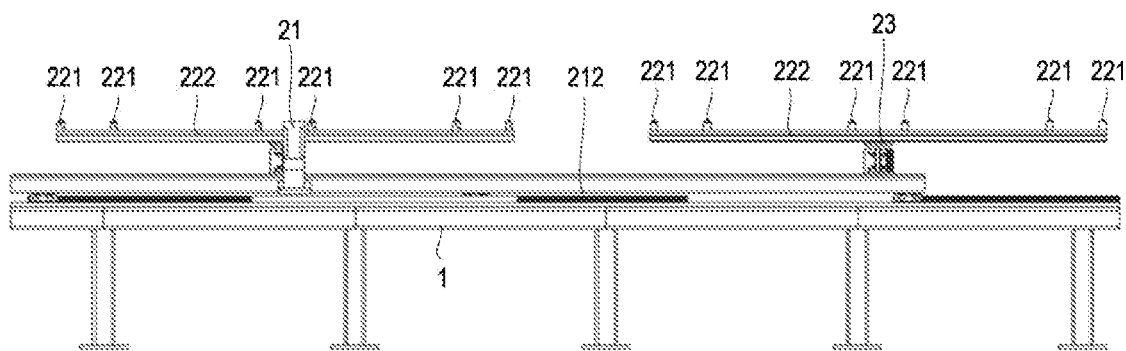
FIG. 7 is a schematic front view of a driving mechanism of a logistics conveying line provided according to an embodiment of the present application.
Figure 8:
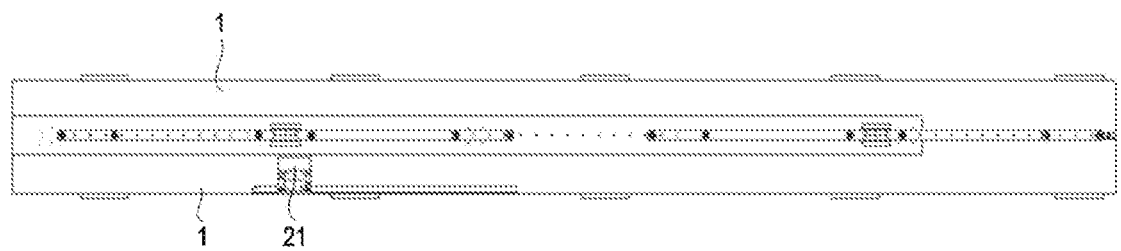
FIG. 8 is a schematic top view of a driving mechanism of a logistics conveying line provided according to an embodiment of the present application.
Figure 9:
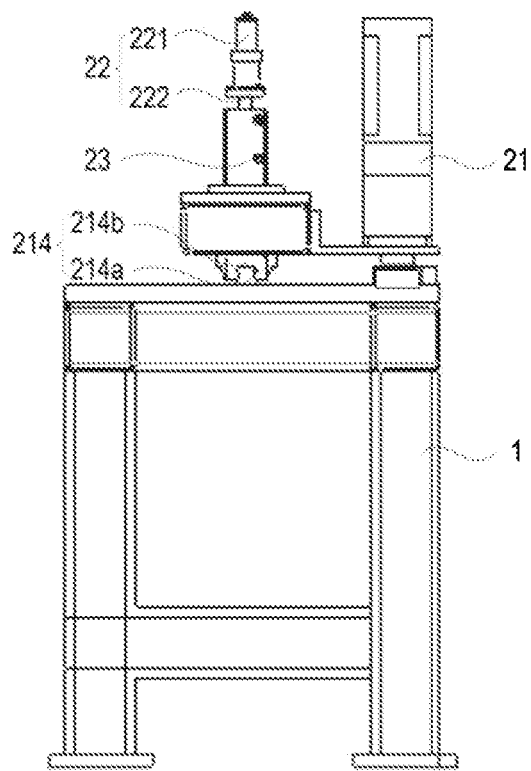
FIG. 9 is a schematic side view of a driving mechanism of a logistics conveying line provided according to an embodiment of the present application.

Referring to FIGS. 1 to 5, FIG. 1 is a three-dimensional schematic structural diagram of a logistics conveying line provided according to an embodiment of the present application, in which some battery cells are placed; FIG. 2 is a schematic side view of a logistics conveying line provided according to an embodiment of the present application; FIG. 3 is a schematic front view of some components of a logistics conveying line provided according to an embodiment of the present application; FIG. 4 is a schematic top view of some components of a logistics conveying line provided according to an embodiment of the present application; and FIG. 5 is a schematic front view of a logistics conveying line provided according to an embodiment of the present application, which is filled with battery cells.

Figure 10:
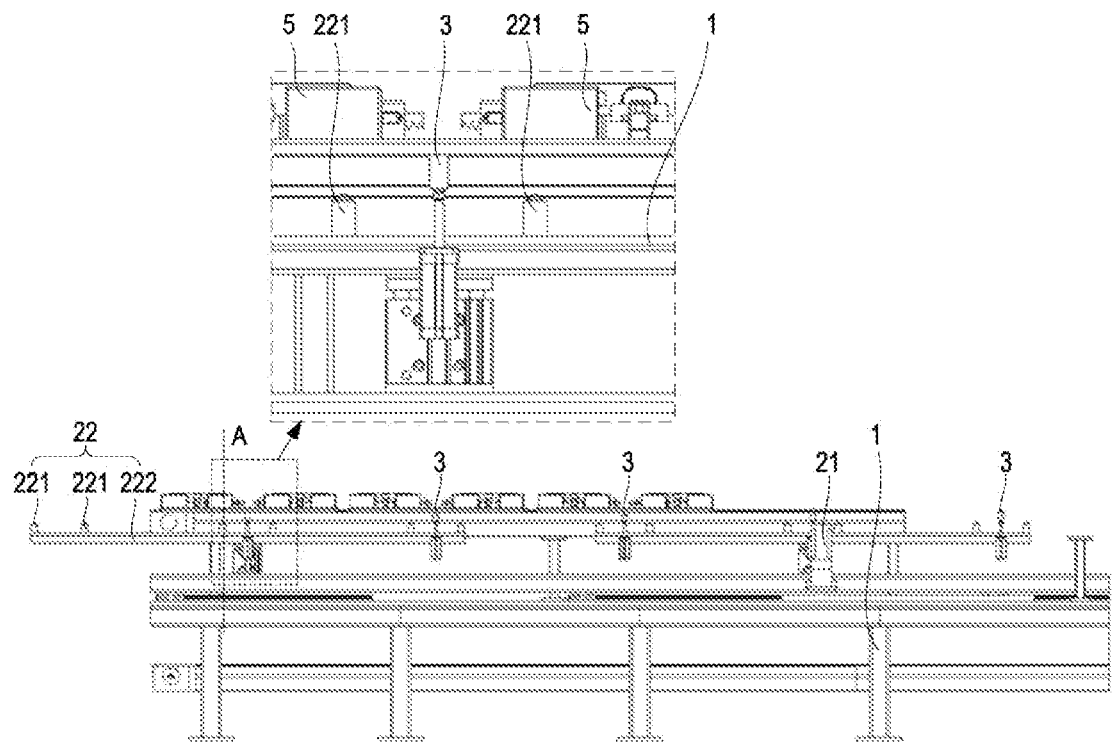
FIG. 10 is a schematic diagram showing connection between a positioning member and a carrier at a station during conveying of battery cells by using a logistics conveying line provided according to an embodiment of the present application.
Figure 14:
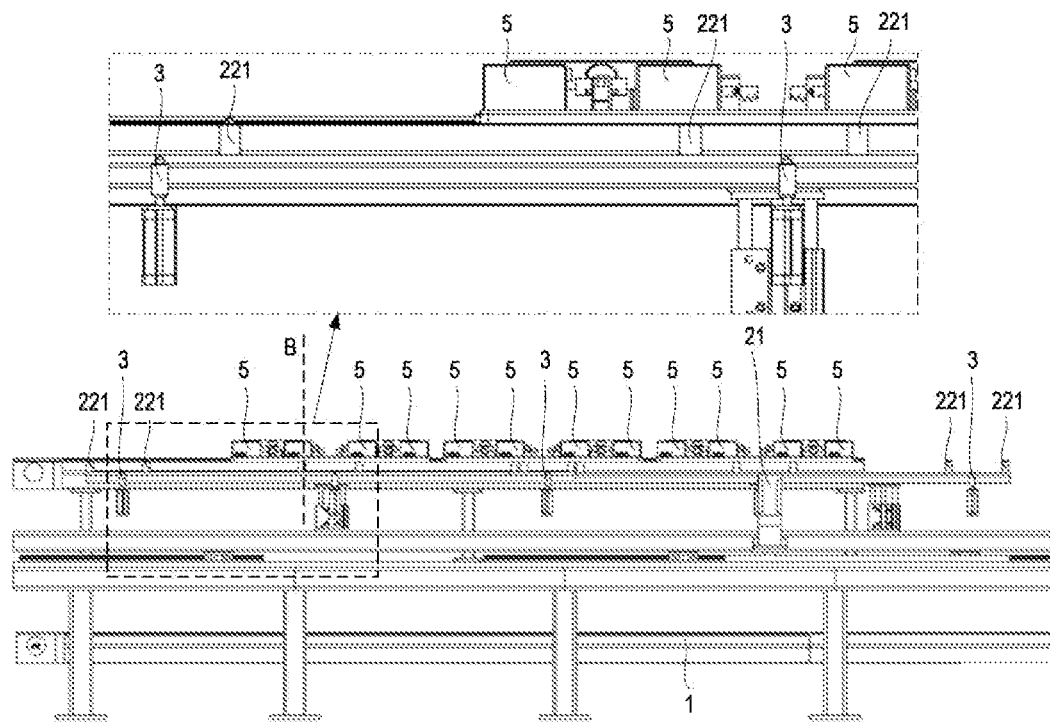
FIG. 14 is a schematic diagram showing the conveying of a battery cell to a next station by using a logistics conveying line provided according to an embodiment of the present application.

In order to clearly describe each direction in the following embodiments, in FIG. 1, an X direction and a Y direction are marked. The X direction is a horizontal movement direction of a battery cell, and is also a lengthwise direction of the conveying line itself. The Y direction is a height direction, and is a direction in which a positioning member 3 and a driving pin 221 that will be described later are lifted or descend. Lifting means movement from bottom to top in the Y direction with reference to the direction shown in FIG. 1, and descending means movement from top to bottom. Movement of each battery cell 5 from one station to a further station means that the battery cell 5 moves in the X direction. The movement of the battery cell 5 may be unidirectional, such as always moving from an upstream station to a downstream station, or may be bidirectional, for example, the battery cell can move from an upstream station to a downstream station and can also move from a downstream station to an upstream station. In order to clearly describe the technical solutions of the embodiments of the present application, the following takes an example in which each battery cell 5 moves from an upstream station to a downstream station, specifically from a station A (such as shown in FIG. 10) to a station B such as shown in FIG. 14). A driving mechanism 2 that drives the battery cell 5 to move reciprocates, that is, the driving mechanism first moves from the station A to the station B, and can also return to the station A from the station B, to wait for a next operation.

An embodiment of the present application provides a logistics conveying line for conveying a workpiece. The logistics conveying line comprises a frame 1 and a driving mechanism 2. The frame 1 comprises at least two stations. The driving mechanism 2 comprises a first driving portion 21 and connecting members 22. The first driving portion 21 is movably mounted to the frame 1, the connecting members 22 are movably mounted to the first driving portion 21, and each of the connecting members 22 is further configured to switch between a connected state and a disconnected state with respect to a carrier 4. The carrier 4 is configured to bear a workpiece. When the connecting member 22 and the carrier 4 are in the connected state, the first driving portion 21 is configured to drive the carrier 4 to move from one of the stations to a further one of the stations.

The logistics conveying line is used to conveying a workpiece. In the field of battery cell processing, an object conveyed by the logistics conveying line is a carrier 4. The carrier 4 is, for example, a tray, and the tray is configured to bear a to-be-processed battery cell 5.

The logistics conveying line comprises at least two stations, and at least one carrier 4 is placed at each station. Specifically, the logistics conveying line is divided into a plurality of stations in its own lengthwise direction, that is, the X direction. A processing apparatus(es) is arranged on a side or two sides of the logistics conveying line in the lengthwise direction, and each processing apparatus is configured to process a workpiece at a corresponding station.

One or more carriers 4 is/are correspondingly placed at at least one station of the logistics conveying line. Specifically, trays may be placed at different stations on the entire conveying line, or trays may be placed at only some stations. For example, FIGS. 1 to 4 schematically show that trays are placed at only some stations of the logistics conveying line, and a battery cell(s) 5 is/are placed in each tray. FIG. 5 schematically shows that trays are placed at all stations of the entire logistics conveying line, and a battery cell(s) 5 is/are placed in each tray.

An existing speed chain (or belt) of the logistics conveying line may be retained or removed. If the speed chain (or belt) is retained, the speed chain (or belt) can reduce a friction force of each carrier 4 during movement of the carrier 4 relative to the speed chain (or belt), making the transfer movement of the carrier 4 smoother.

The driving mechanism 2 is started when the carrier 4 needs to be transferred and transported. When the battery cell 5 in the carrier 4 does need to be transferred and transported, for example, when the battery cell is being processed, the driving mechanism 2 does not operate. As described above, the driving mechanism 2 comprises a first driving portion 21 and connecting members 22. The first driving portion 21 is movably mounted to the frame 1. Specifically, a movement direction of the first driving portion 21 relative to the frame 1 is parallel to a workpiece conveying direction, as shown in the X direction in FIG. 1.

Refer to FIGS. 1 to 9, especially FIGS. 6 to 9. A frame 1 comprises connecting frames 12 that are arranged opposite to each other. The connecting frames 12 are roughly elongated, and legs 13 are provided at various positions in a lengthwise of the connecting frame 12 to support the connecting frame 12. As shown in FIG. 1, the frame 1 is divided into at least two stations in the lengthwise direction of the logistics conveying line. One or more carriers 4 is/are placed at each of the stations.

In some embodiments of the present application, movement control logic adopted by the first driving portion 21 is as follows: the first driving portion 21 moves linearly from the station A to the station B, and then returns from the station B to the station A. Through the linear movement of the first driving portion 21 relative to the frame 1, a carrier 4 at the station A is conveyed to the station B. Then, the first driving portion 21 returns to the station A alone, waiting for the conveying of a next carrier 4 from the station A to the station B.

Each connecting member 22 is further configured to switch between a connected state and a disconnected state with respect to a carrier 4. When the connecting member 22 and the carrier 4 are in the connected state, the first driving portion 21 is configured to drive the carrier 4 to move from one of the stations to a further one of the stations.

There are a plurality of manners of connecting the connecting member 22 to the carrier 4, such as insertion, hooking, and pushing, which can implement an abutting acting force between the connecting member and the carrier during movement, so that the connecting member and the carrier are connected to each other reliably, so as to meet requirements for high-speed transfer transportation, so that the no matter how fast the driving speed of the first driving portion 21 is, the carrier 4 can be reliably transferred and transported with the connecting member 22.

During transfer transportation, each positioning member 3 and a carrier 4 are kept in a disconnected state, while each connecting member 22 and a carrier 4 are kept in a connected state. However, during processing of the battery cell 5, the connecting member 22 can keep fixed connection with the carrier 4, so that the carrier 4 is more stably fixed to a station, thereby further improving positioning reliability of the carrier 4. Certainly, during the processing of the battery cell 5, the connecting member 22 may be kept disconnected from the carrier 4, and the positioning member 3 alone fixes the carrier 4.

The logistics conveying line provided in the above technical solution is provided with a frame 1 and a driving mechanism 2. The driving mechanism 2 comprises a first driving portion 21 and connecting members 22. The frame 1 is fixed, the first driving portion 21 can move relative to the frame 1, and the first driving portion 21 drives the connecting members 22 to move synchronously during movement. Since each of the connecting members 22 and a carrier 4 for bearing a battery cell 5 may be kept in a connected state or may be disconnected, when the connecting member 22 and the carrier 4 are in the connected state, the movement of the connecting member 22 with the first driving portion 21 may drive the carrier 4 to move synchronously, so as to implement the movement of the battery cell 5 from one station to a further station. When the connecting member 22 and the carrier 4 are in a disconnected state, the movement of the connecting member 22 with the first driving portion 21 does not drive the carrier 4 to move synchronously, so that both the connecting member 22 and the first driving portion 21 can return to an original position. In the above technical solution, when the connecting member 22 and the carrier 4 are in the connected state, the connecting member and the carrier are in contact with each other, and there is an abutting acting force therebetween, so that no matter how fast a moving speed of the connecting member 22 is, the carrier 4 can be driven to move synchronously. This greatly increases the speed of moving the battery cell 5 from one station to a further station, and improves the production efficiency of the battery cell 5.

According to some embodiments of the present application, optionally, referring to FIGS. 1 to 9, in some embodiments, the first driving portion 21 comprises a driving member 211, the driving member 211 is movably connected to the frame 2, and the driving member 211 is connected to the connecting member 22.

A mechanism that can finally implement linear movement is adopted as the driving member 211. Specifically, for example, the driving member 211 may directly output power in a linear direction, or may output rotational kinetic energy, and then a transmission mechanism is adopted to convert the rotational kinetic energy into linear kinetic energy.

In the above technical solution, there are a plurality of forms of implementing the driving member 211, which can implement stable and rapid transfer transportation of the battery cell 5.

According to some embodiments of the present application, optionally, still referring to FIGS. 1 to 9, in some embodiments, the driving member 211 comprises one of: a motor, a hydraulic cylinder, and a pneumatic cylinder.

In some embodiments, a servo motor/stepper motor is adopted as the driving member 211.

The motor, the hydraulic cylinder, the pneumatic cylinder or the like is adopted as the driving member 211, which has a simple and compact structure and is controlled reliably. If the servo motor/stepper motor is adopted, displacement of the servo motor/stepper motor can be precisely controlled, thereby omitting other unnecessary limiting components and a blocking component, and further shortening the unnecessary waiting time.

According to some embodiments of the present application, optionally, still referring to FIGS. 1 to 9, in some embodiments, the first driving portion 21 further comprises a first matching component 213, and the driving member 211 comprises a motor; the first matching component 213 is connected to a driving shaft of the driving member 211; and the frame 1 is further provided with a second matching component 11, and the first matching component 213 is drivingly connected to the second matching component 11.

The first matching component 213 is drivingly connected to the second matching component 11 in a manner such as gear meshing or gear-and-rack meshing, or a structure that converts kinetic energy from rotational kinetic energy to linear kinetic energy is implemented. Through the matching of the first matching component 213 and the second matching component 11, the linear kinetic energy is output, and then the first driving portion 21 moves linearly in the X direction relative to the frame 1.

As described above, there are a plurality of stations provided through division in the lengthwise direction of the frame 1. The first driving portion 21 moves in the X direction relative to the frame 1, and actually, the first driving portion 21 moves between stations. Through the movement of the first driving portion 21, the first driving portion 21 itself, each connecting member 22 mounted to the first driving portion 21 and the carrier 4 connected by the connecting member 22 are moved from one station to a further station. In the above technical solution, the first matching component 213 and the second matching component 11 match to implement driving connection, so that the driving connection is more reliable, and the component arrangement is more convenient.

According to some embodiments of the present application, optionally, the first matching component 213 is a gear, the second matching component 11 comprises a rack, and the gear meshes with the rack.

As described above, a motor is adopted as the driving member 211. The first matching component 213 is connected to a driving shaft of the driving member 211. Kinetic energy of the driving member 211 is transmitted to the gear by means of the driving shaft, and then to the rack. Through the matching of the gear and the rack, the linear kinetic energy is output, and then the first driving portion 21 moves linearly in the X direction relative to the frame 1.

According to some embodiments of the present application, optionally, the driving member 211 is slidably connected to the frame 1, such that the driving member 211 moves linearly relative to the frame 1.

Specifically, the driving member 211 may be slidably connected to the frame 1 by means of a guide member 214. The guide member 214 is of multiple structures that can guide in a linear motion direction, such as a guide rail slider structure and a linear guide rail.

The driving member 211 and the frame 1 move in a slip manner, resistance during the movement is small, and the movement is smoother.

According to some embodiments of the present application, optionally, in some embodiments, the driving member 211 is slidably connected to the frame 1 by means of a guide member 214; and the guide member 214 comprises a slide rail 214a and a slider 214b. The slide rail 214a is mounted to the frame 1. The slider 214b is mounted to a housing of the driving member 211. The slider 214b matches the slide rail 214a, such that the slider 214b moves linearly relative to the slide rail 214a.

For the slide rail 214a, specifically, for example, the slide rail 214a is fixed to the frame 1 by means of a connecting component such as bolt, or is welded to the frame 1. The slide rail 214a is elongated, and the length of the slide rail 214a fits with set limit displacement of the driving mechanism 2, so as to play a guiding role during the entire linear movement of the driving mechanism 2. The slider 214b is mounted to the housing of the driving member 211, which may be specifically by means of welding or bolted connection.

The slide rail 214a is relatively large in size, and the slider 214b is relatively small in size. In the above technical solution, the slide rail 214a with a larger size is set as a fixed part, and the slider 214b is set as a component that can move linearly with the housing of the driving member 211. With this arrangement, the driving member 211 has a small bearing weight during movement and requires less power, the overall size of the movable part is small, and the entire movable part has a compact and small structure and moves more stably and reliably.

According to some embodiments of the present application, optionally, the first driving portion 21 further comprises a first supporting member 212, and the first supporting member 212 is fixedly connected to the housing of the driving member 211, to move with movement of the driving member 211; and the connecting members 22 are movably mounted to the first supporting member 212.

Each first driving portion 21 may independently drive one connecting member 22 to act, or each first driving portion 21 may drive a plurality of connecting members 22 to act. The latter setting manner is taken as an example herein. The first supporting member 212 comprises a strip-shaped plate.

Connecting members 22 are movably mounted to the first driving portion 21. Specifically, a movement direction of the connecting members 22 relative to the first driving portion 21 is perpendicular to the X direction, that is, in a vertical direction, that is, the Y direction in FIG. 1.

Through the arrangement of the first supporting member 212, a plurality of connecting members 22 are mounted to a common first supporting member 212. The first driving portion 21 moves linearly, to drive the first supporting member 212 to move linearly synchronously, and then drive each connecting member 22 located on the first supporting member 212 to move linearly synchronously.

According to some embodiments of the present application, optionally, the connecting member 22 comprises driving pins 221 and a second supporting member 222, the driving pins 221 are mounted to the second supporting member 222, and the driving pins 221 are further configured to be connected to the carrier 4.

Specifically, the second supporting member 222 is an elongated plate, rod or column. Each second supporting member 222 is provided with a plurality of driving pins 221. Driving pins 221 mounted to a common second supporting member 222 are lifted or descend synchronously. A stepping cylinder is adopted as the second driving portion 23. One of a cylinder barrel and a piston rod of the stepping cylinder is mounted to the first supporting member 212, and the other one is fixedly connected to the second supporting member 222. The driving pins 221 are fixedly mounted to the second supporting member 222. The extension or retraction of the stepping cylinder may drive the second supporting member 222 to extend or retract synchronously, and then implement the extension or retraction of driving pins 221. A bottom of each carrier 4 is provided with a recessed portion 41. After each of the driving pins 221 extends, the driving pin 221 is inserted into the recessed portion 41 of the carrier 4. In this state, the linear movement of the driving pin 221 with the first driving portion 21 may drive the carrier 4 to move linearly synchronously. After the driving pin 221 retracts, the driving pin 221 moves away from the recessed portion 41 of the carrier 4, and there is no connection relationship therebetween. In this state, the linear movement of the driving pin 221 with the first driving portion 21 does not affect the position of the carrier 4 on the frame 1.

As described above, when a carrier 4 is fixed to a station, it is required to process a battery cell 5 located on the carrier 4. In this case, the connecting member 22 and the carrier 4 may be kept in a connected state or a disconnected state. Since each station is mounted to a liftable positioning member 3, the positioning member 3 is also kept connected to the carrier 4. At this time, if the connecting member 22 and the carrier 4 are kept in the connected state, the positioning member 3 and the connecting member 22 jointly stably fix the carrier 4 to the current station. This fixes the carrier 4 to the current station more reliably, and the carrier 4 does not move easily during battery cell processing. At this time, if the connecting member 22 and the carrier 4 are kept in a disconnected state, the carrier 4 is still fixed to the current station because the positioning member 3 and the carrier 4 are kept in a connected state.

Considering the continuity of the entire process, after the connecting member 22 moves the carrier 4 from the station A to the station B, and after the positioning member 3 is connected to the carrier 4, the connecting member 22 retracts to leave the carrier 4. Then, the driving member 211 drives the connecting member 22 to return to the station A by means of the first supporting member 212, so as to prepare for conveying a next carrier 4.

In the above technical solution, the tray is driven by inserting the driving pins 221, so that the speed of the logistics line is increased from 18 m/min to at least 48 m/min, thereby greatly increasing the speed of moving the battery cell 5, and improving processing efficiency.

It has been described above that the connecting member 22 can be switched between the connected state and the disconnected state with respect to the carrier 4, and some specific implementations will be described below. According to some embodiments of the present application, optionally, the driving mechanism 2 further comprises second driving portions 23, wherein the second driving portions 23 are mounted to the first supporting member 212 and drivingly connected to the connecting member 22, to drive the connecting member 22 to move, such that the connecting member 22 switches between the connected state and the disconnected state with respect to the carrier 4.

The second driving portions 23 is implemented by adopting, for example, a linear motor, a pneumatic cylinder, or a hydraulic cylinder. In some embodiments, the second driving portion 23 drives the connecting member 22 to move in a direction, specifically, such as vertical lifting or descending.

Each first supporting member 212 may be provided with a plurality of second driving portions 23. In the embodiment illustrated in FIG. 6, each first supporting member 212 is provided with two second driving portions 23. The two second driving portions 23 are arranged at a distance from each other in the X direction. The two second driving portions 23 are independent. In terms of control logic, the two second driving portions 23 may operate synchronously, such that all connecting members 22 located on a common first supporting member 212 are lifted or descend synchronously. When the connecting members 22 are lifted, the connecting members 22 each approach a carrier 4. When the connecting member 22 is lifted in place, the connecting member 22 is connected to the carrier 4. In this state, the linear movement of the connecting member 22 may drive the carrier 4 to move linearly synchronously. When the connecting member 22 descends, the connecting member 22 is disconnected from the carrier 4. When the connecting member 22 descends in place, the connecting member 22 is disconnected from the carrier 4. In this state, the linear movement of the connecting member 22 does not drive the carrier 4 to move linearly synchronously, and the carrier 4 does not move with the movement of the connecting member 22.

The second driving portion 23 may be of a same structure or different structures. In some embodiments, each second driving portion 23 is implemented by adopting a pneumatic cylinder, a hydraulic cylinder or another power component that directly outputs linear kinetic energy, specifically, such as a stepping cylinder. On the one hand, the above arrangement is adopted considering that a movement space of the connecting member 22 is relatively narrow, and if a power conversion mechanism is arranged, the arrangement difficulty is high, so that the structure of the logistics conveying line is too complicated. On the other hand, the control of the stepping cylinder is accurate, which can implement precise control of a lifting or descending height of the connecting member 22.

Connecting members 22 located at a common station may be driven to lift or descend by the same second driving portion 23, or may be driven to lift or descend by two or more second driving portions 23. Connecting members 22 may be in a one-to-one correspondence with second driving portions 23, or a plurality of connecting members 22 may correspond to one second driving portion 23.

In the above technical solution, the second driving portions 23 are adopted to change the positions of the connecting members 22, and then change the positions of the connecting members 22 and the carriers 4 relative to each other. This mechanical driving manner has high reliability, and kinetic energy transmission between components is sufficient.

According to some embodiments of the present application, optionally, a plurality of second driving portions 23 are spaced and mounted on each first supporting member 212.

Each second driving portion 23 corresponds to one driving pin 221, or a plurality of driving pins 221 may correspond to one second driving portion 23.

In the above technical solution, one first supporting member 212 is adopted to drive a plurality of second driving portions 23 to move synchronously, and the second driving portions 23 drive a plurality of driving pins 221, so that the driving efficiency is high.

According to some embodiments of the present application, optionally, the logistics conveying line further comprises positioning members 3, wherein at least one positioning member 3 is movably mounted on each of the stations, and the positioning member(s) 3 is/are configured to fix the carrier 4 to the current station.

Specifically, during processing of each battery cell 5 by a processing apparatus, the carrier 4 bearing the battery cell 5 needs to be kept stationary to ensure that each processing operation is performed normally. In order to implement fixed connection between carriers 4 and stations, in some embodiments, the logistics conveying line further comprises positioning members 3, wherein at least one positioning member 3 is movably mounted at each station, a moving direction of each positioning member 3 relative to the frame 1 is, for example, a vertical direction, that is, the positioning member 3 can be lifted or descend, and a lifting/descending direction is the Y direction. The positioning member 3 cannot move horizontally relative to the frame 1, that is, the positioning member 3 is fixed in the X direction and can be lifted or descend in the Y direction.

The positioning member 3 is configured in such a manner that a carrier 4 is fixed to the station. The positioning member 3 is, for example, a positioning pin. Specifically, the positioning member 3 changes its position to implement the switching of the positioning member 3 between a connected state and a disconnected state with respect to the carrier 4. When the positioning member 3 and the carrier 4 are in the connected state, the carrier 4 is fixed to the current station. When the positioning member 3 and the carrier 4 are in the disconnected state, the carrier 4 can be driven by the driving mechanism 2 to implement transfer transportation.

Specifically, the positioning member 3 and the carrier 4 match in the following manner: the bottom of the carrier 4 is provided with a through hole 42 (refer to FIG. 17), and the through hole 42 matches the positioning member 3. When the positioning member 3 in an extended state is inserted into the through hole 42 at the bottom of the carrier 4, the carrier 4 and the positioning member 3 are in a connected state. At this time, the carrier 4 is fixed to this station by the positioning member 3. When the positioning member 3 in a retracted state leaves the through hole 42 at the bottom of the carrier 4, the carrier 4 and the positioning member 3 are in a disconnected state. In this state, the carrier 4 can be moved from one station to a further station under the driving of the driving mechanism 2 to be described later, that is, transfer transportation is implemented.

Each carrier 4 is correspondingly provided with at least one positioning member 3. If two or more positioning pins are provided, a phenomenon such as rotation of the carrier 4 at a station can be effectively prevented, so that the carrier 4 is more reliably fixed to the station. Each station is provided with at least one positioning member 3, and each positioning member 3 is separately provided with a driving source to implement the lifting and descending of the positioning member 3, so that a state of each positioning member 3 can be precisely and independently controlled. Certainly, positioning members 3 that perform the same action may also be driven by a common driving source, and the driving source drives the positioning members 3 to act synchronously by means of a transmission mechanism. This requires a smaller number of driving sources.

According to some embodiments of the present application, a logistics conveying system comprises a logistics conveying line provided according to any one of the technical solutions of the present application and carriers 4, wherein at least one carrier 4 is placed at each station.

The specific content of the logistics conveying line has been described above, and will not be described herein again. The carrier 4 is configured to bear a battery cell 5, and may be specifically a tray. One or more battery cells 5 may be placed in each tray. After being processed at one station, the battery cell 5 is moved to a next station for subsequent processing. No connecting component is provided between the battery cell 5 and the tray. Common translation of the battery cell and the tray is implemented by means of a friction force, so as to implement transfer transportation. The so-called transfer transportation means the movement of a carrier 4 from one station to a further station. Battery cells 5 located in one tray move synchronously. Battery cells 5 located at a same station may also move synchronously.

As described in detail above, the logistics conveying system provided in the above technical solution can efficiently transfer a carrier 4 between stations because the system has the logistics conveying line provided in the above technical solution.

According to some embodiments of the present application, optionally, a bottom of each carrier 4 is provided with a recessed portion 41, and the recessed portion 41 matches a connecting member 22; the connecting member 22 in an extended state is inserted into the recessed portion 41, and the carrier 4 and the connecting member 22 are in a connected state; and the connecting member 22 in a retracted state leaves the recessed portion 41, and the carrier 4 and the connecting member 22 are in a disconnected state.

As described above, the connecting member 22 comprises driving pins 221. After each of the driving pins 221 extends, the driving pin 221 is inserted into the recessed portion 41 of the carrier 4. In this state, the driving pin 221 drives the carrier 4 to move linearly synchronously. After the driving pin 221 retracts, that is, after the driving pin 221 moves away from the recessed portion 41 of the carrier 4, there is no connection relationship between the driving pin 221 and the carrier 4. In this state, the linear movement of the driving pin 221 with the first driving portion 21 does not affect the position of the carrier 4 on the frame 1.

The tray is driven by insertion, so that the speed of the logistics line is increased from 18 m/min to at least 48 m/min, thereby greatly increasing the speed of moving the battery cell 5, and improving processing efficiency.

Referring to FIGS. 10 to 18, an embodiment of the present application further provides a logistics conveying method, which is implemented by adopting a logistics conveying system provided according to any one of the above embodiments of the present application. The method comprises the following steps. In step S100, connecting members 22 located at a common station are driven to extend, such that each of the connecting members 22 is inserted into a carrier 4 corresponding to the connecting member 22, to keep the connecting member 22 and the carrier 4 in a connected state. In step S200, a first driving portion 21 is driven to drive both the connecting member 22 and the carrier 4 connected to the connecting member 22 to move from the current station to a further station.

Referring to FIGS. 10 to 18, taking an example in which a carrier 4 located at the most upstream is at a station A, in order to facilitate the comparative description of a displacement process of each battery cell 5, one driving pin 221 is used as a reference in FIGS. 10 to 17 to mark a station where the carrier 4 is located. It should be noted that due to the limitation of a view direction, positions of some components are not marked in FIGS. 10 to 18. In this case, reference may be further made to the marked positions of the components in FIGS. 1 to 9 above. Referring to FIG. 10, when each battery cell 5 at a station A is in a processing state, the carrier 4 is fixed by a positioning member 3. The positioning member 3 is in a lifted state, and the positioning member 3 is inserted into a through hole 42 at the bottom of the carrier 4. At this time, a driving pin 221 is in a retracted (or descending) state, and the driving pin 221 is far away from a recessed portion 41 at the bottom of the carrier 4. The driving pin 221 is disconnected from the carrier 4.

After being processed at the station A, the battery cell 5 needs to be moved to a station B. Then, the logistics conveying method is adopted to implement the displacement of the battery cell 5, that is, steps S100 and S200 are performed.

Figure 11:
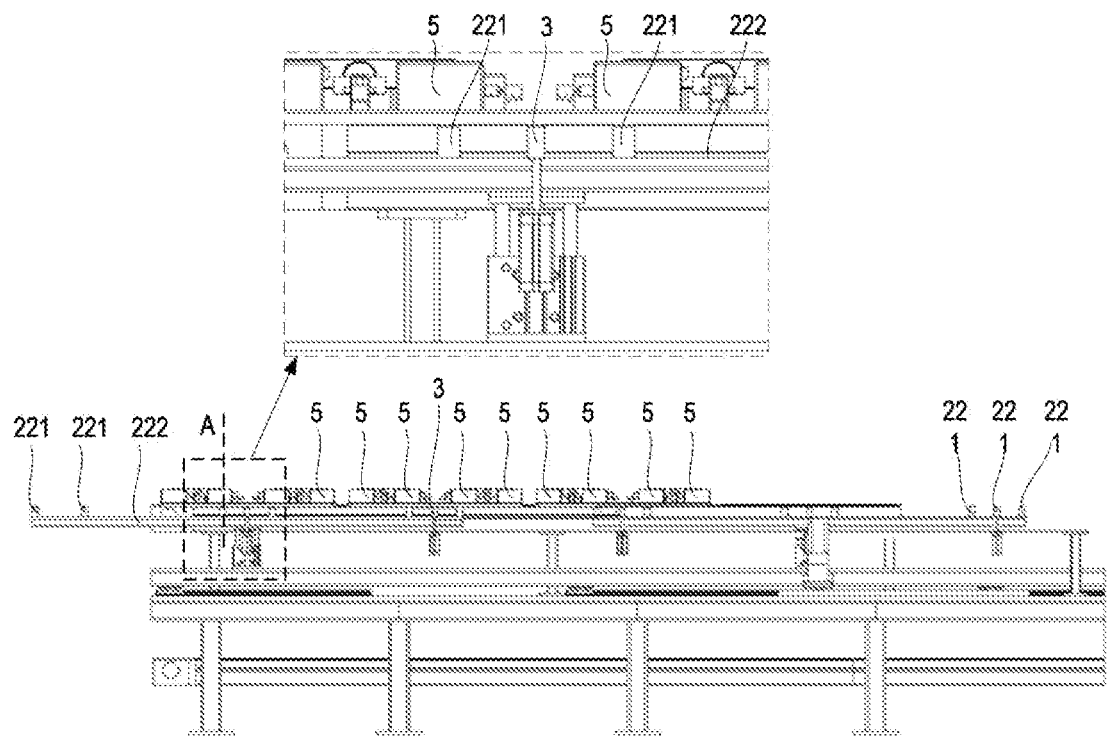
FIG. 11 is a schematic diagram showing connection between a carrier and both a driving pin and a positioning member at a station during conveying of battery cells by using a logistics conveying line provided according to an embodiment of the present application.

When step S100 is performed, the following operations are performed at the station A: the positioning member 3 is kept in the previous lifted state, and then the connecting member 22 is lifted. Referring to FIG. 11, after the connecting member 22 is lifted in place, the connecting member 22 is inserted into the recessed portion 41 at the bottom of the carrier 4, and the positioning member 3 is inserted into the through hole 42 at the bottom of the carrier 4.

Figure 12:
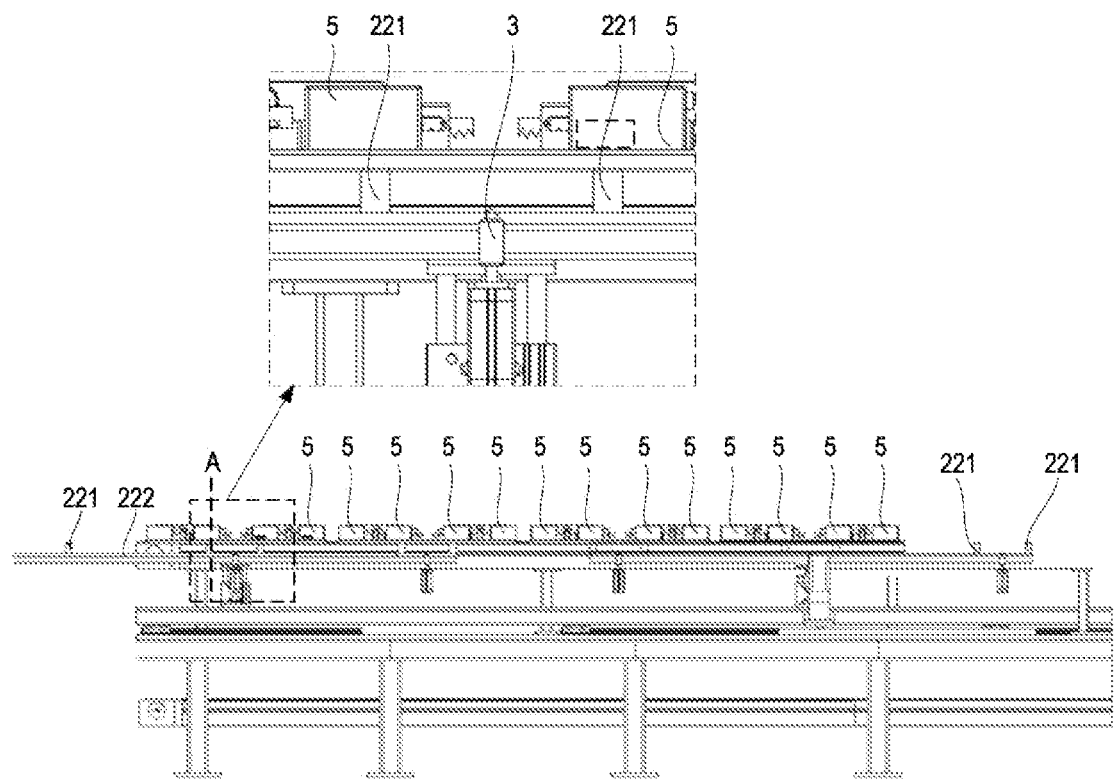
FIG. 12 is a schematic diagram showing connection between a driving pin and a carrier during conveying of battery cells by using a logistics conveying line provided according to an embodiment of the present application.

Then, referring to FIG. 12, still at the station A, the positioning member 3 is retracted, such that the positioning member 3 leaves the through hole 42 at the bottom of the carrier 4. After the positioning member 3 leaves the carrier 4, only the driving pin 221 and the carrier 4 are kept in a connected state.

A first driving portion 21 is a component that provides linear power. After the first driving portion 21 is started, the first driving portion 21 moves in a direction from the station A to the station B relative to the frame 1. Because the connecting member 22 is connected to the first driving portion 21 by means of a second driving portion 23, the linear movement of the first driving portion 21 relative to the frame 1 may drive the connecting member 22 to move linearly synchronously. The connecting member 22 is kept connected to the carrier 4, so that the carrier 4 also moves with the linear movement of the first driving portion 21, thereby implementing the movement of the carrier 4 from the station A to the station B. It should be noted that the station B and the station A are different, and there is no upstream-downstream relationship therebetween. However, during production of the battery cell 5, the station B may be located downstream of the station A, and may be an adjacent station downstream, or may be another nonadjacent station downstream.

Figure 13:
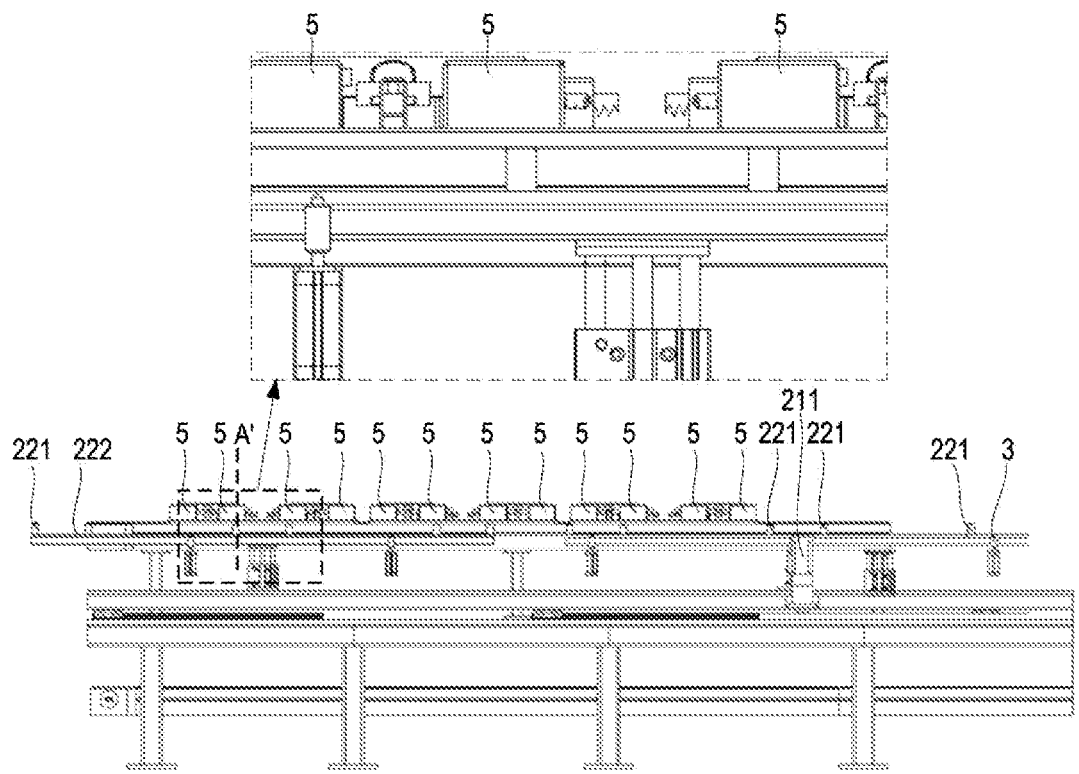
FIG. 13 is a schematic diagram showing a connection relationship between a driving pin and a carrier during conveying of battery cells by using a logistics conveying line provided according to an embodiment of the present application.

Next, referring to FIG. 13, a driving motor 211 of a first driving portion 21 is started, and the driving motor 211 moves linearly relative to the frame 1, to drive each driving pin 221 and a carrier 4 connected by the driving pin 221 to move linearly synchronously. FIG. 13 shows a schematic diagram showing the movement of the carrier 4 to an intermediate position A'. The intermediate position A' is located between the station A and the station B.

Referring to FIG. 14, after the driving motor 211 of the first driving portion 21 drives the carrier 4 to move to the station B, the carrier stops at the station B. Herein, for respective states of the driving pin 221 and the positioning member 3, reference may be made to an enlarged part of FIG. 14. The driving pin 221 and the carrier 4 are kept in a connected state, and the positioning member 3 located at the station B is far away from the carrier 4.

In the above manner, throughout the transfer transportation of the carrier, a connection relationship between the carrier 4 and at least one of the positioning member 3 and the connecting member 22 is kept. In this way, the carrier 4 is always limited, thereby preventing the carrier 4 from being subjected to slip, deviation caused by touch, and the like.

As described above, the second driving portion 23 is drivingly connected to the connecting member 22. The connecting member 22 comprises driving pins 221 and a second supporting member 222. A stepping cylinder is adopted as the second driving portion 23. By controlling a telescopic action of the stepping cylinder, the connecting member 22 can be extended. The carrier 4 does not need to be moved, and the connecting member 22 is automatically inserted into the recessed portion 41 of the carrier 4 after being lifted. The positioning of the carrier 4 on the frame 1 can be implemented by adopting another positioning mechanism, or by adopting the existing technology, which will not be described in detail herein. The driving pin 22 is used to drive the carrier 4 during transfer transportation, so that reliable mechanical fixation between the driving pin 22 and the carrier 4 exists, the movement is reliable, and the speed is very fast. In addition, a movement amount of the driving pin 22 is controlled by a servo motor, so that precise movement can also be implemented provided that the speed is very high.

According to some embodiments of the present application, optionally, in some embodiments, the logistics conveying method further comprises the following steps. In step S300, a positioning member 3 located at the further station is driven to extend to fix the carrier 4 to the further station. In step S400, at the further station, the connecting member 22 is retracted to disconnect the connecting member 22 from the carrier 4. In step S500, the first driving portion 21 is driven to return, to drive the connecting member 22 to return to the original station from the further station.

Figure 15:
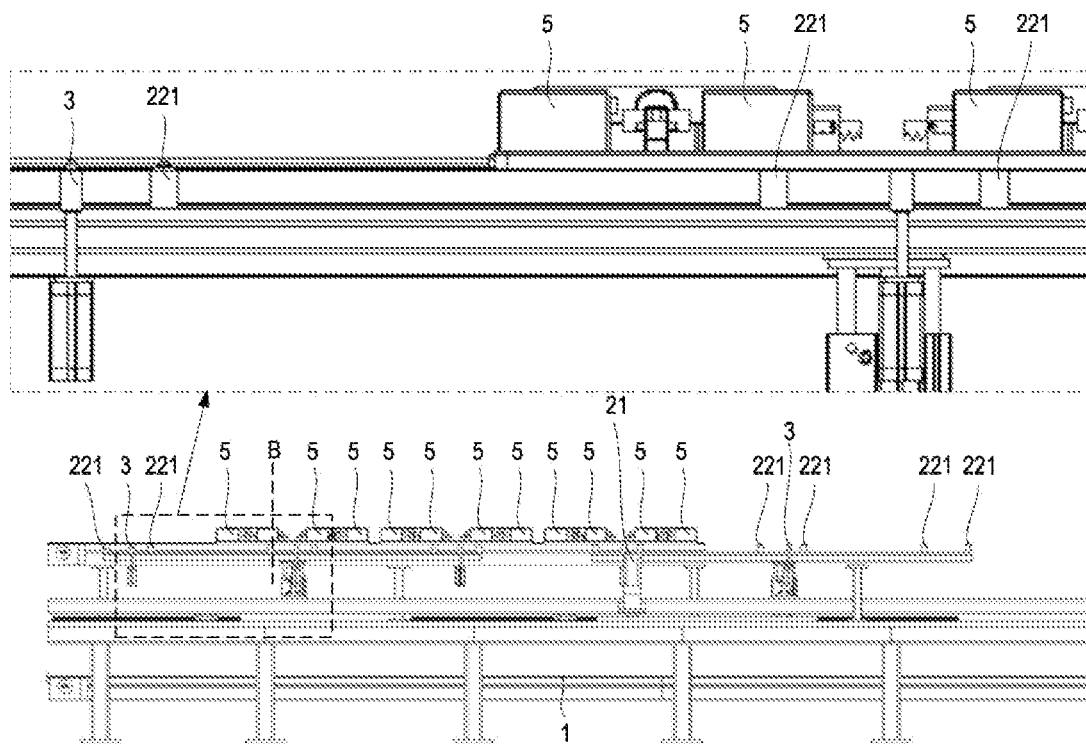
FIG. 15 is a schematic diagram showing connection between a positioning member and a carrier at a next station after a battery cell is conveyed to the next station by using a logistics conveying line provided according to an embodiment of the present application.

In step S300, referring to FIG. 15, the positioning member 3 at the station B is lifted, so that the positioning member 3 at the station B is inserted into the through hole 42 at the bottom of the carrier 4. At this time, the positioning member 3 and the driving pin 221 at the station B are both kept connected to the carrier 4.

In step S400, at the station B, the driving pin 221 is retracted, to move away from the carrier 4 at the station B.

Figure 16:
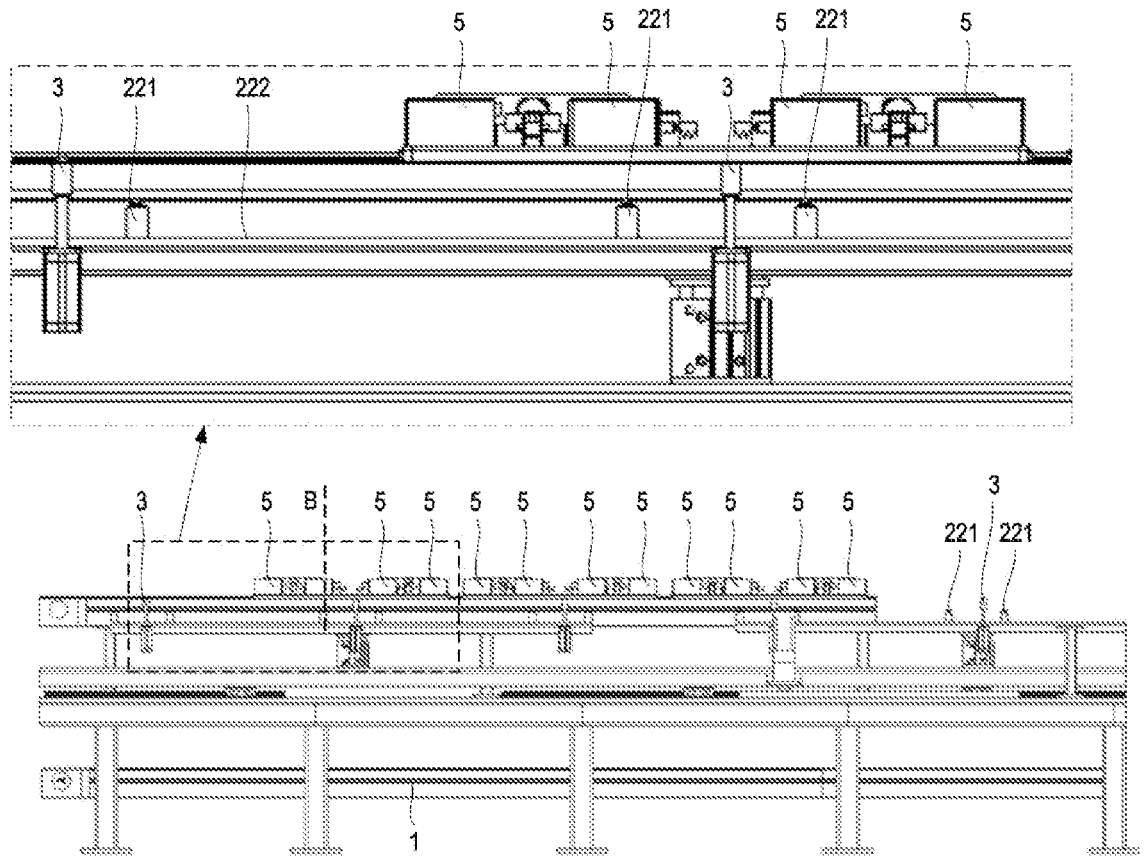
FIG. 16 is a schematic diagram showing disconnection of a driving pin from a carrier after a battery cell is conveyed to a next station by using a logistics conveying line provided according to an embodiment of the present application.
Figure 17:
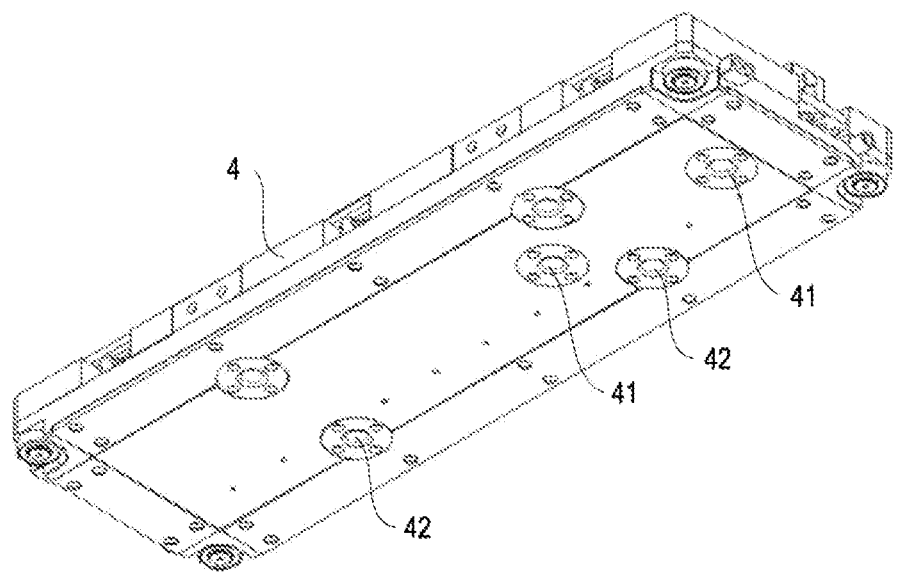
FIG. 17 is a three-dimensional schematic structural diagram of a carrier of a logistics conveying system provided according to an embodiment of the present application.
Figure 18:
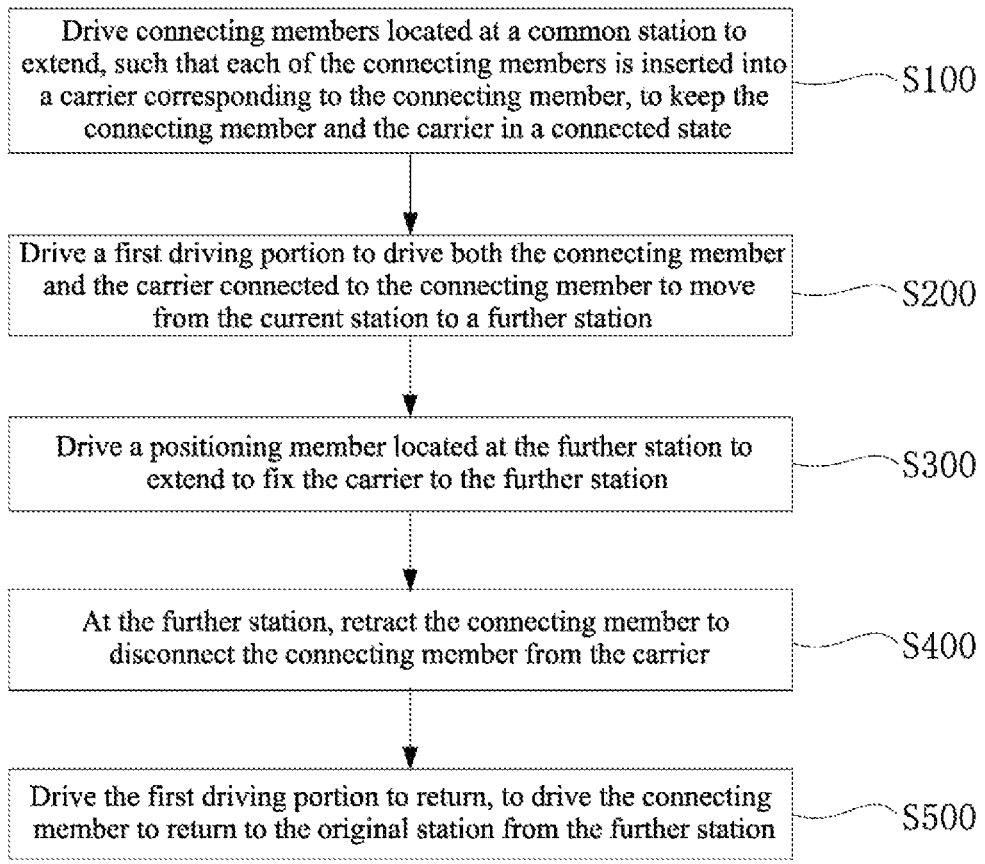
FIG. 18 is a schematic flow chart of a logistics conveying method provided according to an embodiment of the present application.

In step S500, referring to FIG. 16, since the movement of the carrier 4 from the station A to the station B has been completed, the driving pin 221 has been disconnected from the carrier 4 at the station B. Then, the driving motor 211 is started again to drive the driving pin 221 back to the station A to wait for a next operation.

In the above technical solution, the carrier 4 can be stably and reliably positioned at both the station A and the station B without separately providing a blocking mechanism, a jacking mechanism, and the like, and an operating time, an action time and a signal interaction time required for actions of these mechanisms are also omitted, so that jacking positioning is no longer needed, unnecessary time investment is reduced, and the processing efficiency is further improved. In addition, each station is provided with a positioning member 3, and during processing by other actuators, the driving mechanism 2 can implement action interaction of returning and inserting the tray and the positioning member 3, that is, an action of inserting the positioning member 3 into the carrier 4 and an action of disconnecting the connecting member 22 from the carrier 4 can be performed simultaneously, and an action of disconnecting the positioning member 3 from the carrier 4 and an action of inserting the connecting member 22 into the carrier 4 can also be performed simultaneously. When other actuators finish the processing, the driving mechanism 2 can immediately move to a next station and continue the processing. The entire process takes a very short time, almost no time is wasted, and the production efficiency is very high.

Finally, it should be noted that the above embodiments are merely used for illustrating rather than limiting the technical solutions of the present application. Although the present application has been illustrated in detail with reference to the foregoing embodiments, it should be understood by those of ordinary skill in the art that the technical solutions described in the foregoing embodiments may still be modified, or some or all of the technical features thereof may be equivalently substituted; and such modifications or substitutions do not make the essence of the corresponding technical solution depart from the scope of the technical solutions of the embodiments of the present application, and should fall within the scope of the claims and the description of the present application. In particular, the technical features mentioned in the embodiments can be combined in any manner, provided that there is no structural conflict. The present application is not limited to the specific embodiments disclosed herein but includes all the technical solutions that fall within the scope of the claims.

What is claimed is:

1. A logistics conveying line for conveying a workpiece, comprising:
    a frame comprising at least two stations; and
    a driving mechanism comprising a driving portion and a connecting member, wherein the driving portion is movably mounted at the frame, the connecting member is movably mounted at the driving portion, the connecting member is configured to switch between a connected state and a disconnected state with respect to a carrier, and the carrier is configured to bear the workpiece; and
    wherein:
        the driving portion is configured to, when the connecting member is in the connected state with respect to the carrier, drive the carrier to move from one of the stations to another one of the stations;
        the driving portion comprises a driving member, wherein the driving member is movably connected to the frame, and the driving member is connected to the connecting member; and
        the connecting member comprises a driving pin and a supporting member, and the driving pin is mounted at the supporting member and configured to be connected to the carrier.

2. The logistics conveying line according to claim 1, wherein the driving member comprises one of: a motor, a hydraulic cylinder, and a pneumatic cylinder.

3. The logistics conveying line according to claim 1, wherein:
    the driving portion further comprises a first matching component, and the driving member comprises a motor;
    the first matching component is connected to a driving shaft of the driving member; and
    the frame is further provided with a second matching component, and the first matching component is drivingly connected to the second matching component.

4. The logistics conveying line according to claim 3, wherein:

the first matching component comprises a gear, and the second matching component comprises a rack; and the gear meshes with the rack.

5. The logistics conveying line according to claim 1, wherein the driving member is slidably connected to the frame, such that the driving member moves linearly relative to the frame.

6. The logistics conveying line according to claim 5, wherein the driving member is slidably connected to the frame by means of a guide member, and the guide member comprises:

a slide rail mounted at the frame; and a slider mounted at a housing of the driving member and matching the slide rail, such that the slider moves linearly relative to the slide rail.

7. The logistics conveying line according to claim 1, wherein the driving portion further comprises:

a supporting member fixedly connected to a housing of the driving member, to move along with the driving member, wherein the connecting member is movably mounted at the supporting member.

8. The logistics conveying line according to claim 7, wherein:

the driving portion is a first driving portion; and the driving mechanism further comprises a second driving portion mounted at the supporting member and drivingly connected to the connecting member, to drive the connecting member to move, such that the connecting member switches between the connected state and the disconnected state with respect to the carrier.

9. The logistics conveying line according to claim 8, wherein the second driving portion is one of a plurality of second driving portions of the driving mechanism that are spaced apart from each other and mounted at the supporting member.

10. The logistics conveying line according to claim 1, further comprising:

a plurality of positioning members, each movably mounted at one of the stations and configured to fix the carrier to the one of the stations.

11. A logistics conveying system, comprising:

the logistics conveying line according to claim 1; and carriers, wherein at least one carrier is placed at each station.

12. The logistics conveying system according to claim 11, wherein:

a bottom of each carrier is provided with a recessed portion, and the recessed portion matches the connecting member;

the connecting member in an extended state is inserted in the recessed portion, and the carrier and the connecting member are in a connected state; and the connecting member in a retracted state leaves the recessed portion, and the carrier and the connecting member are in a disconnected state.

13. A logistics conveying method applicable to the logistics conveying line according to claim 1, comprising:

driving the connecting member located at one of the stations to extend, such that the connecting member is inserted into the carrier corresponding to the connecting member, to keep the connecting member and the carrier in a connected state; and driving the driving portion to drive both the connecting member and the carrier connected to the connecting member to move from the one of the stations to a downstream station.

14. The logistics conveying method according to claim 13, further comprising:

driving the positioning member located at the downstream station to extend to fix the carrier to the downstream station;

at the downstream station, retracting the connecting member to disconnect the connecting member from the carrier; and driving the driving portion to return, to drive the connecting member to return to the one of the stations.

\* \* \* \* \*